(12) United States Patent
Suzuki et al.

(10) Patent No.: US 8,390,884 B2
(45) Date of Patent: Mar. 5, 2013

(54) APPARATUS AND METHOD FOR IMAGE PROCESSING, AND PROGRAM

(75) Inventors: Masaru Suzuki, Tokyo (JP); Shinichiro Gomi, Chiba (JP); Yusuke Nakamura, Chiba (JP); Tomonori Masuno, Tokyo (JP)

(73) Assignee: Sony Corporation, Tokyo (JP)

( * ) Notice: Subject to any disclaimer, the term of this patent is extended or adjusted under 35 U.S.C. 154(b) by 855 days.

(21) Appl. No.: 12/551,626

(22) Filed: Sep. 1, 2009

(65) Prior Publication Data

US 2010/0060915 A1   Mar. 11, 2010

(30) Foreign Application Priority Data

Sep. 8, 2008   (JP) ................ P2008-229311

(51) Int. Cl.
*H04N 1/60* (2006.01)
(52) U.S. Cl. ........................ 358/1.9; 382/191
(58) Field of Classification Search ............... 358/1.9, 358/3.01; 382/164, 173, 190, 191, 192, 194, 382/195, 224
See application file for complete search history.

(56) References Cited

U.S. PATENT DOCUMENTS

| | | | | |
|---|---|---|---|---|
| 5,715,377 A * | 2/1998 | Fukushima et al. | ........... | 358/1.9 |
| 6,195,459 B1 * | 2/2001 | Zhu | ................ | 382/176 |
| 6,771,833 B1 * | 8/2004 | Edgar | ............... | 382/254 |
| 7,840,071 B2 * | 11/2010 | Tang et al. | ............... | 382/176 |
| 2005/0093989 A1 * | 5/2005 | Imai | ............... | 348/222.1 |
| 2008/0279456 A1 * | 11/2008 | Kasahara et al. | ............ | 382/190 |
| 2008/0279460 A1 * | 11/2008 | Kasahara et al. | ............ | 382/224 |
| 2009/0160967 A1 * | 6/2009 | Imai | ............... | 382/195 |
| 2010/0142807 A1 * | 6/2010 | Yasuda et al. | ............... | 382/173 |
| 2011/0157411 A1 * | 6/2011 | Hata | ............... | 382/165 |
| 2012/0201453 A1 * | 8/2012 | Furuya | ............... | 382/167 |

FOREIGN PATENT DOCUMENTS

| | | |
|---|---|---|
| JP | 10-021394 | 1/1998 |
| JP | 2005-064650 | 3/2005 |
| JP | 2005-184790 | 7/2005 |
| JP | 2005-310123 | 11/2005 |
| JP | 2008-154261 | 7/2008 |

* cited by examiner

*Primary Examiner* — Kimberly A Williams
(74) *Attorney, Agent, or Firm* — Finnegan, Henderson, Farabow, Garrett & Dunner, L.L.P.

(57) ABSTRACT

An image processing apparatus includes a frequency information extracting unit configured to extract frequency information of an input image, a color information extracting unit configured to extract color information of the input image, a feature amount calculating unit configured to calculate a feature amount of the input image on the basis of the frequency information extracted by the frequency information extracting unit and the color information extracted by the color information extracting unit, and a scene determining unit configured to determine a scene of the input image on the basis of the feature amount calculated by the feature amount calculating unit.

6 Claims, 15 Drawing Sheets

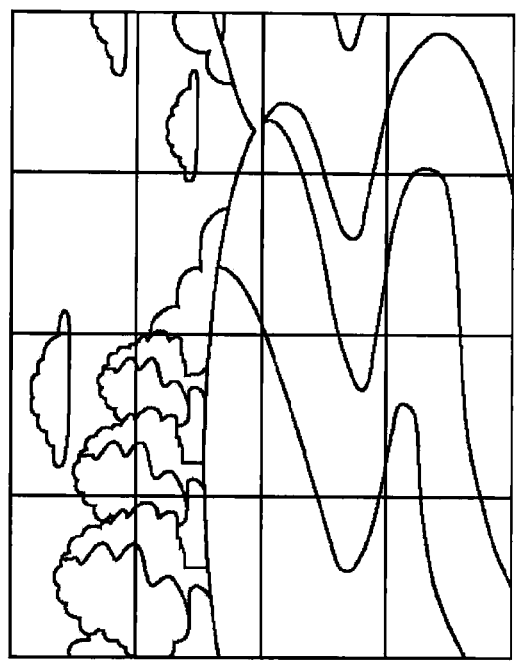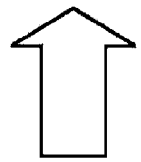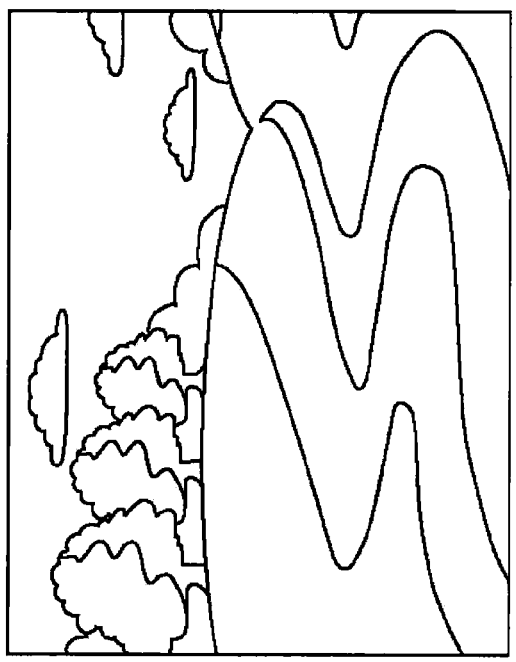
FIG. 3

APPARATUS AND METHOD FOR IMAGE PROCESSING, AND PROGRAM

BACKGROUND OF THE INVENTION

1. Field of the Invention

The present invention relates to apparatuses and methods for image processing and programs therefor, and in particular, relates to an image processing apparatus and method capable of performing more detailed scene determination and a program therefor.

2. Description of the Related Art

There has been used a technique of analyzing image data captured through an imaging apparatus, such as a digital camera, to determine a shot (captured scene) on the basis of a result of analysis.

When the captured scene is determined on the basis of only frequency information (brightness signal) included in the image data, however, colors in the image data are not determined.

For example, Japanese Unexamined Patent Application Publication No. 2008-154261 discloses a technique of determining a characteristic hue that is a hue characterizing image data to determine a captured scene.

SUMMARY OF THE INVENTION

Assuming that a captured scene is a landscape, however, the number of hues characterizing the landscape is not limited to one. In particular, if the same landscape is photographed in different seasons, hues characterizing respective captured images cover a variety of colors. According to the above-described technique disclosed in Japanese Unexamined Patent Application Publication No. 2008-154261, it may be difficult to perform more detailed scene determination.

The present invention has been made in consideration of the above-described circumstances. It is desirable to enable more detailed scene determination.

According to an embodiment of the present invention, an image processing apparatus includes frequency information extracting means for extracting frequency information of an input image, color information extracting means for extracting color information of the input image, feature amount calculating means for calculating a feature amount of the input image on the basis of the frequency information extracted by the frequency information extracting means and the color information extracted by the color information extracting means, and scene determining means for determining a scene of the input image on the basis of the feature amount calculated by the feature amount calculating means.

The image processing apparatus may further include dividing means for dividing the input image into blocks. The frequency information extracting means may extract a frequency information item of the input image from each block. The color information extracting means may extract a color information item of the input image from each block.

The image processing apparatus may further include weighting means for weighting a block having an integrated value of the frequency information item, extracted from the block by the frequency information extracting means, equal to or higher than a predetermined threshold value. The feature amount calculating means may calculate a feature amount of the input image on the basis of the frequency information items and the color information items of the blocks weighted by the weighting means.

The image processing apparatus may further include edge region detecting means for detecting an edge region from each block of the input image. The weighting means may weight a block having an integrated value of the frequency information item, extracted from the block excluding the edge region, equal to or higher than the predetermined threshold value.

The image processing apparatus may further include saturation calculating means for calculating a saturation of each pixel of the input image and weighting means for weighting a block having an integrated value of the saturations, extracted from the block by the saturation calculating means, equal to or higher than a predetermined threshold value. The feature amount calculating means may calculate a feature amount of the input image on the basis of the frequency information items and the color information items of the blocks weighted by the weighting means.

The image processing apparatus may further include highest-frequency color setting means for setting a highest-frequency-color information item indicating a color with the highest frequency of appearance in each block on the basis of the color information items of the input image. The feature amount calculating means may calculate a feature amount of the input image on the basis of the frequency information items and the highest-frequency-color information items set for the blocks by the highest-frequency color setting means.

According to another embodiment of the present invention, there is provided a method for image processing, including the steps of extracting frequency information of an input image, extracting color information of the input image, calculating a feature amount of the input image on the basis of the extracted frequency information and the extracted color information, and determining a scene of the input image on the basis of the calculated feature amount.

According to another embodiment of the present invention, there is provided a program that allows a computer to perform a process including the steps of extracting frequency information of an input image, extracting color information of the input image, calculating a feature amount of the input image on the basis of the extracted frequency information and the extracted color information, and determining a scene of the input image on the basis of the calculated feature amount.

According to any of the above-described embodiments of the present invention, frequency information is extracted from an input image, color information is extracted from the input image, a feature amount of the input image is calculated on the basis of the extracted frequency information and color information, and a scene of the input image is determined on the basis of the calculated feature amount.

According to any of the embodiments of the present invention, more detailed scene determination can be achieved.

BRIEF DESCRIPTION OF THE DRAWINGS

FIG. 3 is a diagram explaining division of an input image;

DESCRIPTION OF THE PREFERRED EMBODIMENTS

Exemplary embodiments of the present invention will be described below with reference to the drawings in the following order:
1. First Embodiment;
2. Second Embodiment; and
3. Third Embodiment.

1. First Embodiment

Configuration of Image Processing Apparatus

Figure 1:
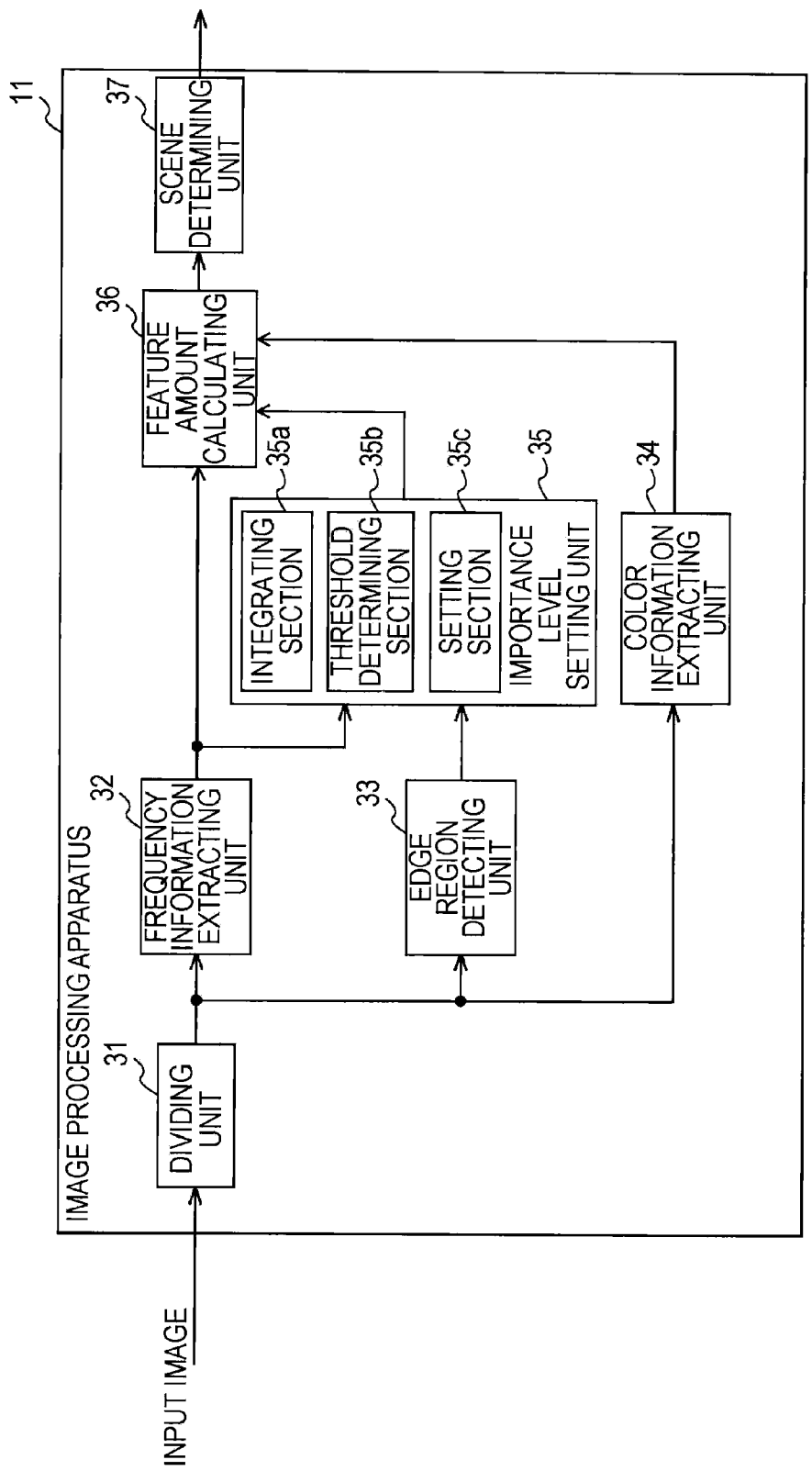
FIG. 1 is a diagram illustrating an exemplary functional configuration of an image processing apparatus according to an embodiment of the present invention.

FIG. 1 illustrates an exemplary functional configuration of an image processing apparatus according to a first embodiment of the present invention.

Referring to FIG. 1, the image processing apparatus, indicated at 11, calculates an amount of feature (hereinafter, "feature amount") of an input image supplied from an imaging apparatus, such as a digital camera, determines a scene of the input image on the basis of the feature amount, and outputs data indicating a result of determination to another image processing apparatus. The other image processing apparatus automatically classifies a plurality of images on the basis of results of determination, or automatically adjusts the quality of an image on the basis of a result of determination.

The image processing apparatus 11 includes a dividing unit 31, a frequency information extracting unit 32, an edge region detecting unit 33, a color information extracting unit 34, an importance level setting unit 35, a feature amount calculating unit 36, and a scene determining unit 37.

The dividing unit 31 divides an input image into blocks of a predetermined size and supplies the blocks to each of the frequency information extracting unit 32, the edge region detecting unit 33, and the color information extracting unit 34.

The frequency information extracting unit 32 extracts frequency information indicating frequency components of spatial frequencies from each of the blocks supplied from the dividing unit 31 using a predetermined filer, and supplies the extracted frequency information to each of the importance level setting unit 35 and the feature amount calculating unit 36.

The edge region detecting unit 33 detects an edge region in each of the blocks supplied from the dividing unit 31 using a predetermined filter and supplies edge region information indicating the edge region to the importance level setting unit 35.

The color information extracting unit 34 extracts color information from each of the blocks supplied from the dividing unit 31 and supplies the color information to the feature amount calculating unit 36. More specifically, the color information extracting unit 34 extracts a hue of each pixel constituting the block by transforming pixel values of the pixel expressed in a red-green-blue (RGB) color space into pixel values expressed in a hue-saturation-value (HSV) or hue-saturation-brightness (HSB) color space using the following expression.

$$\text{Hue} = \begin{cases} 60 \times \dfrac{G-B}{\text{MAX} - \text{MIN}} & \text{If MAX} = R \\ 60 \times \dfrac{B-R}{\text{MAX} - \text{MIN}} + 120 & \text{If MAX} = G \\ 60 \times \dfrac{R-G}{\text{MAX} - \text{MIN}} + 240 & \text{If MAX} = B \end{cases} \quad (1)$$

In Expression (1), MAX denotes a maximum value of R, G, and B values and MIN denotes a minimum value of the R, G, and B values. When MAX−MIN=0, Hue=0. In addition, when Hue<0 or Hue≧360, Hue=Hue mod 360 (remainder obtained by dividing Hue by 360).

The importance level setting unit 35 sets a level of importance (weight) for color information, extracted from each block by the color information extracting unit 34, on the basis of the corresponding frequency information supplied from the frequency information extracting unit 32 and the corresponding edge region information supplied from the edge region detecting unit 33. The level of importance for color information will be called "color-information importance level" hereinafter. The importance level setting unit 35 supplies the set color-information importance levels of the respective blocks to the feature amount calculating unit 36.

The importance level setting unit 35 includes an integrating section 35a, a threshold determining section 35b, and a setting section 35c.

The integrating section 35a integrates characteristic values corresponding to the amplitudes of frequency outputs in each block excluding an edge region, indicated by the corresponding edge region information supplied from the edge region detecting unit 33, on the basis of the corresponding frequency information supplied from the frequency information extracting unit 32.

The threshold determining section 35b determines whether an integrated value of the characteristic values in a target block is equal to or higher than a predetermined threshold value.

The setting section 35c sets a color-information importance level in accordance with a result of determination by the threshold determining section 35b.

The feature amount calculating unit 36 calculates a feature amount of the input image on the basis of pieces of frequency information (hereinafter, "frequency information items") of the respective blocks supplied from the frequency information extracting unit 32, pieces of color information (hereinafter, "color information items") thereof supplied from the color information extracting unit 34, and color-information importance levels thereof supplied from the importance level setting unit 35 and supplies the calculated feature amount to the scene determining unit 37.

The scene determining unit 37 determines a scene of the input image on the basis of the feature amount supplied from the feature amount calculating unit 36 and outputs a result of determination to the other image processing apparatus.

Scene Determining Process by Image Processing Apparatus

A scene determining process performed by the image processing apparatus 11 of FIG. 1 will now be described with reference to a flowchart of FIG. 2.

In step S11, the dividing unit 31 divides an input image into blocks of the predetermined size and supplies the blocks to each of the frequency information extracting unit 32, the edge region detecting unit 33, and the color information extracting unit 34. For example, the dividing unit 31 divides an input image, captured by photographing an open countryside, shown in the left part of FIG. 3 into 16 (=4×4) blocks shown in the right part of FIG. 3. Referring to FIG. 3, the divided blocks have the same shape and the same number of pixels without overlapping. The division is not limited to this example. The blocks may overlap. The blocks may have different shapes and different numbers of pixels. The number of blocks is not limited to 16. The input image may be divided into another number of blocks.

Figure 4:
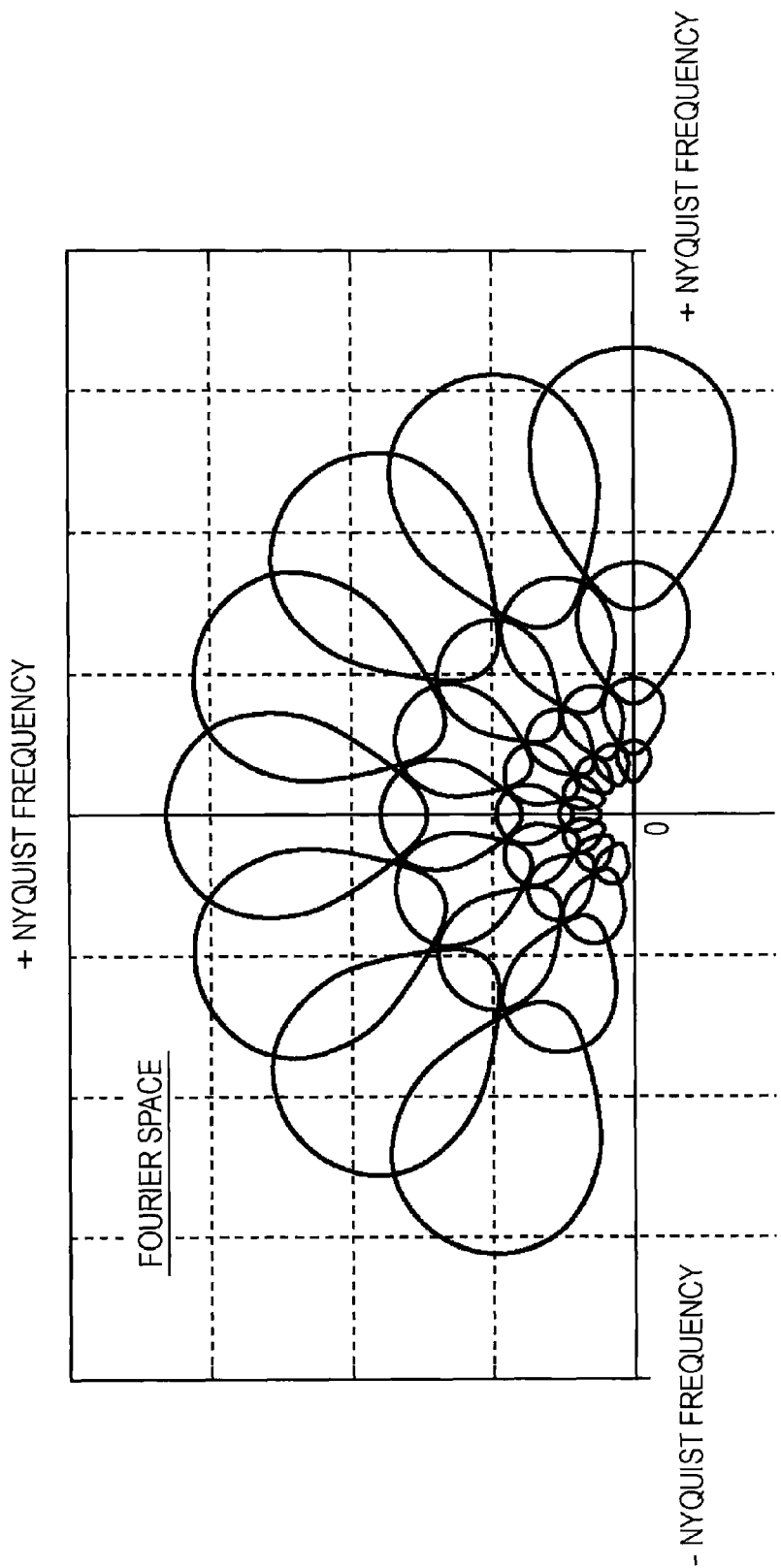
FIG. 4 is a diagram explaining extraction of frequency information.

In step S12, the frequency information extracting unit 32 extracts frequency information indicating frequency components of spatial frequencies from each of the blocks supplied from the dividing unit 31 using the predetermined filter and supplies the frequency information to each of the importance level setting unit 35 and the feature amount calculating unit 36. More specifically, the frequency information extracting unit 32 converts pixels of each block into a frequency domain by Fourier transform to extract frequency information using, for example, Gabor filters having frequency amplitude characteristics as shown in FIG. 4. On a Fourier space shown in FIG. 4, 32-dimensional frequency information is obtained through 32 Gabor filters using eight different orientations and four different scales (frequency domain scales). In addition, the frequency information extracting unit 32 performs inverse frequency transformation on different frequency bands in each block converted in the frequency domain, thus converting the frequency domain into a pixel space. As for the extraction of frequency information, for example, a band pass filter (BPF) may be used instead of the above-described Gabor filter.

In step S13, the edge region detecting unit 33 detects an edge region using a Laplacian filter from each of the blocks supplied from the dividing unit 31 and supplies edge region information indicating the detected edge region to the importance level setting unit 35. More specifically, the edge region detecting unit 33 evaluates the size and spatial continuity of an output of the Laplacian filter for each pixel of the block to determine whether the pixel is located in an edge region, thus detecting the edge region. The filter used for edge region detection is not limited to the Laplacian filter. For example, a Sobel filter or a Prewitt filter may be used.

In step S14, the color information extracting unit 34 extracts color information from each of the blocks supplied from the dividing unit 31 and supplies the color information to the feature amount calculating unit 36. More specifically, the color information extracting unit 34 extracts a hue of each pixel constituting the block by transforming pixel values of the pixel expressed in the RGB color space into pixel values expressed in the HSV color space. In this case, a hue is extracted as color information. The color information is not limited to this example. RGB values can be used as color information.

In step S15, the importance level setting unit 35 performs color-information importance level setting processing of setting an importance level for color information (color-information importance level) for each block on the basis of the corresponding frequency information supplied from the frequency information extracting unit 32 and the corresponding edge region information supplied from the edge region detecting unit 33.

Figure 5:
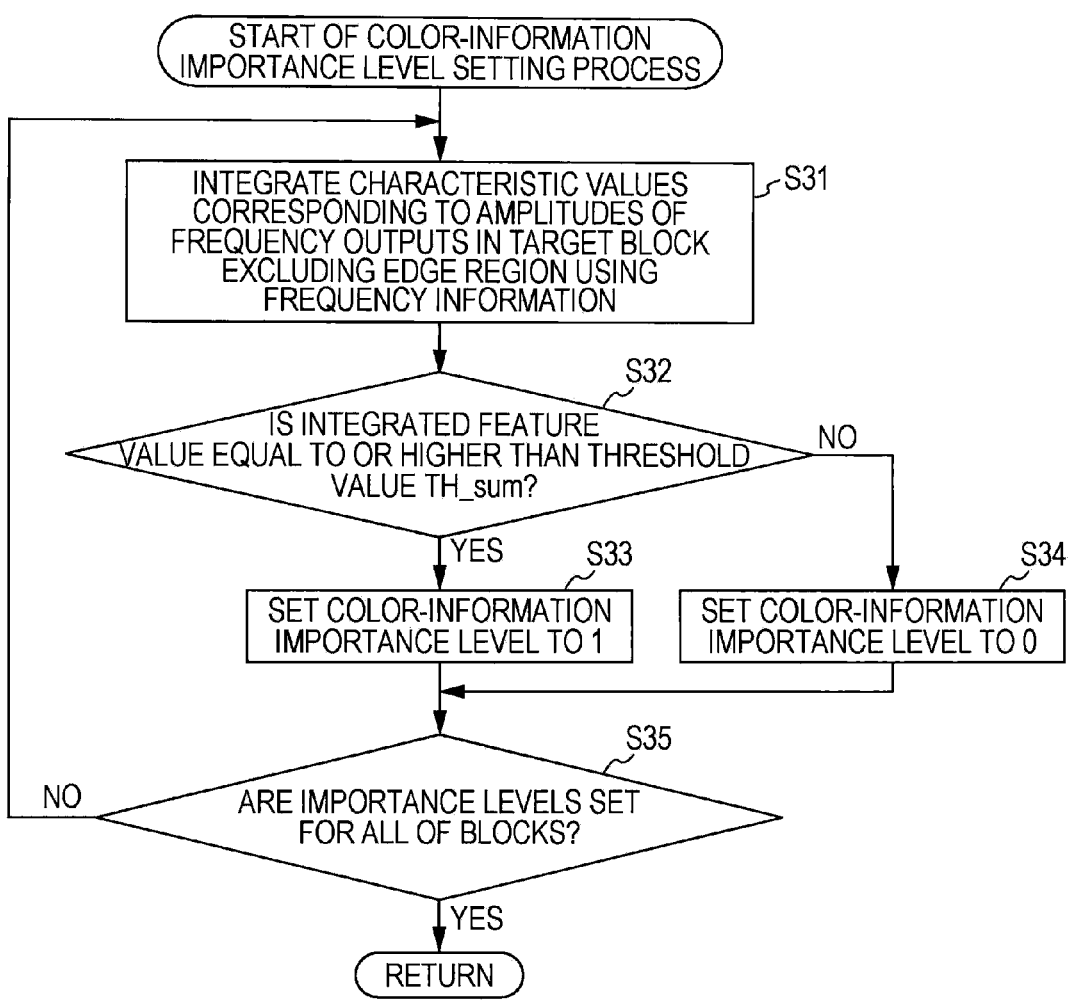
FIG. 5 is a flowchart explaining a color-information importance level setting process.

Color-Information Importance Level Setting Processing by Importance Level Setting Unit The color-information importance level setting processing (or process) in step S15 in the flowchart of FIG. 2 will now be described with reference to a flowchart of FIG. 5.

In step S31, the integrating section 35a of the importance level setting unit 35 integrates characteristic values corresponding to the amplitudes of frequency outputs in a block (hereinafter, also referred to as "target block") excluding an edge region, indicated by the corresponding edge region information supplied from the edge region detecting unit 33, on the basis of the corresponding frequency information supplied from the frequency information extracting unit 32.

In step S32, the threshold determining section 35b determines whether an integrated value of the characteristic values (hereinafter, also referred to as "integrated characteristic value") in the target block is equal to or higher than a predetermined threshold value TH_sum.

Figure 6:
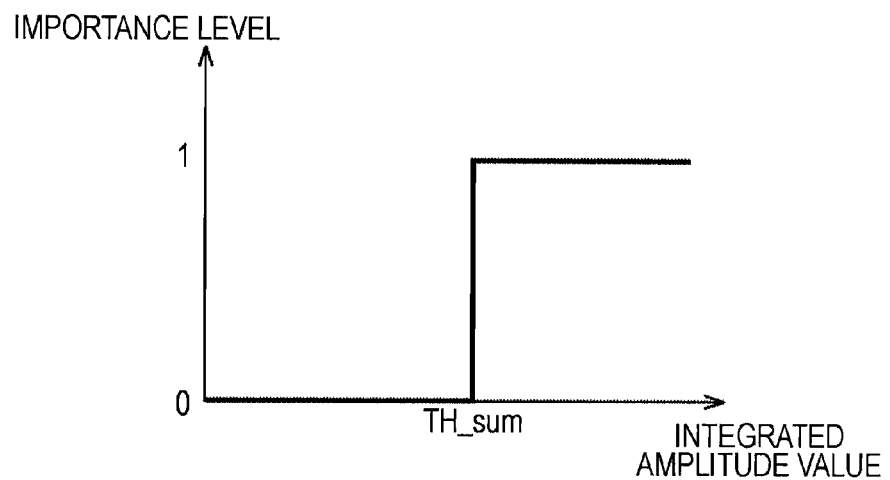
FIG. 6 is a diagram explaining setting of a color-information importance level.

When it is determined in step S32 that the integrated characteristic value is equal to or higher than the predetermined threshold value TH_sum, the setting section 35c sets a color-information importance level of the target block to 1, as shown in FIG. 6, in step S33. The process proceeds to step S35.

FIG. 6 illustrates a change in the color-information importance level plotted against the integrated value (integrated amplitude value) of characteristic values corresponding to the amplitudes of frequency outputs.

Referring to FIG. 6, when the integrated amplitude value is equal to or higher than the predetermined threshold value TH_sum, the color-information importance level is set to 1. When the integrated amplitude value is not equal to or higher than the predetermined threshold value TH_sum, the color-information importance level is set to 0.

Whereas, if it is determined in step S32 that the integrated value (integrated amplitude value) of the characteristic values is not equal to or higher than the predetermined threshold value TH_sum, the setting section 35c sets the color-information importance level of the target block to 0, as shown in FIG. 6, in step S34. The process proceeds to step S35.

In step S35, the setting section 35c determines whether color-information importance levels are set for all of the blocks.

If it is determined in step S35 that the color-information importance levels are not set for all of the blocks, the process returns to step S31. Steps S31 to S35 are repeated until the color-information importance levels are set for all of the blocks.

Figure 2:
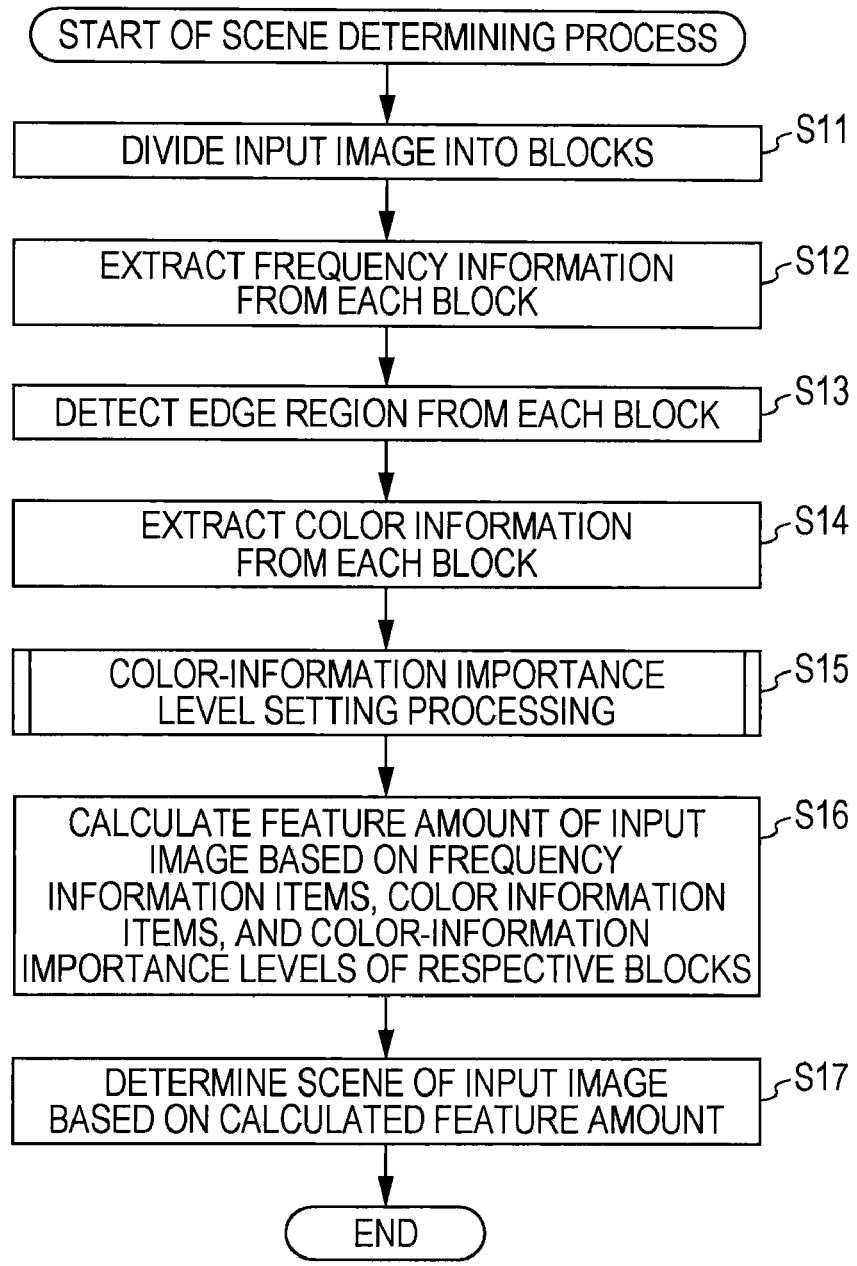
FIG. 2 is a flowchart explaining a scene determining process performed by the image processing apparatus in FIG. 1.

Whereas, if it is determined in step S35 that the color-information importance levels are set for all of the blocks, the process returns to step S15 in the flowchart of FIG. 2.

One color-information importance level is set for each block in the above-described manner.

According to the above-described process, a weight can be set for a block in which the total amount of a texture region, obtained by removing an edge region from the block, is higher than a predetermined value.

As for the color-information importance levels, two values distinguished from each other using the threshold value TH_sum are used in the above description. Continuous values continuously varying in a range of 0 to 1 depending on an integrated value of characteristic values related to frequency information may be used as color-information importance levels.

As for threshold processing, an integrated value calculated after noise removal on characteristic values corresponding to the amplitudes of frequency outputs may be used. Alternatively, a maximum characteristic value in a target block may be used.

Referring again to the flowchart of FIG. 2, in step S16, the feature amount calculating unit 36 calculates a feature amount of the input image on the basis of the frequency information items of the respective blocks supplied from the frequency information extracting unit 32, the color information items thereof supplied from the color information extracting unit 34, and the color-information importance levels thereof supplied from the importance level setting unit 35. The feature amount calculating unit 36 supplies the calculated feature amount to the scene determining unit 37.

More specifically, the feature amount calculating unit 36 integrates characteristic values corresponding to the amplitudes of frequency outputs of the respective blocks on the basis of the frequency information items. Consequently, a 512-dimensional (=16 (blocks)×8 (frequency orientations)×4 (frequency domain scales)) vector is obtained as a feature amount based on the frequency information items.

In addition, the feature amount calculating unit 36 obtains an integrate value of the color information items of the respective blocks and multiplies the integrated value by the color-information importance levels set for the respective blocks. Thus, a 16-dimensional (=16 (blocks)×1 (integrated color-information value)) vector is obtained as a feature amount based on the color information items. In this case, color information of a block with a color-information importance level of 0 is handled as 0.

As described above, the feature amount calculating unit 36 calculates a 528-dimensional (=512 (dimensions)+16 (dimensions)) vector as a feature amount on the basis of the frequency information items and the color information items.

In step S17, the scene determining unit 37 determines a scene of the input image on the basis of the feature amount (vector) from the feature amount calculating unit 36 and outputs a result of determination to the other image processing apparatus. More specifically, the scene determining unit 37 performs scene determination using previously set learning images and machine learning, such as a support vector machine (SVM).

In the SVM, two-class determination (one-to-one determination) is performed. For example, objects are classified into two classes, for example, a class "open countryside and summer" and another class, alternatively, a class "open countryside and winder" and another class. Scores of the respective classes are compared. A class with the highest score indicates a result of determination.

The scene determining unit 37 uses the SVM. Machine learning is not limited to the SVM. For example, pattern recognition using a neutral network or pattern recognition using pattern matching may be used.

Figure 7:
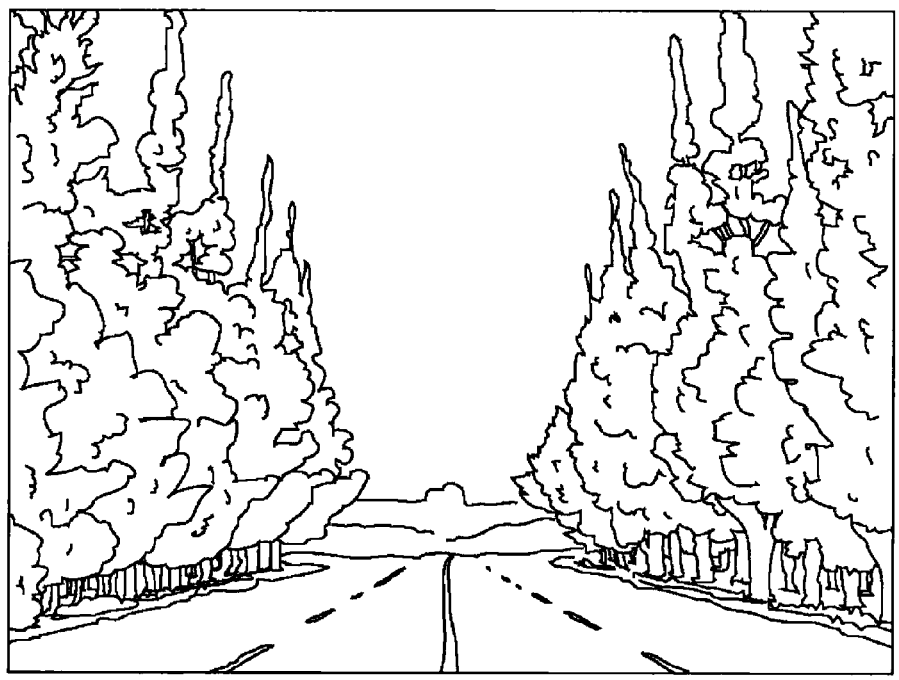
FIG. 7 is a diagram illustrating an image subjected to scene determination.
Figure 8:
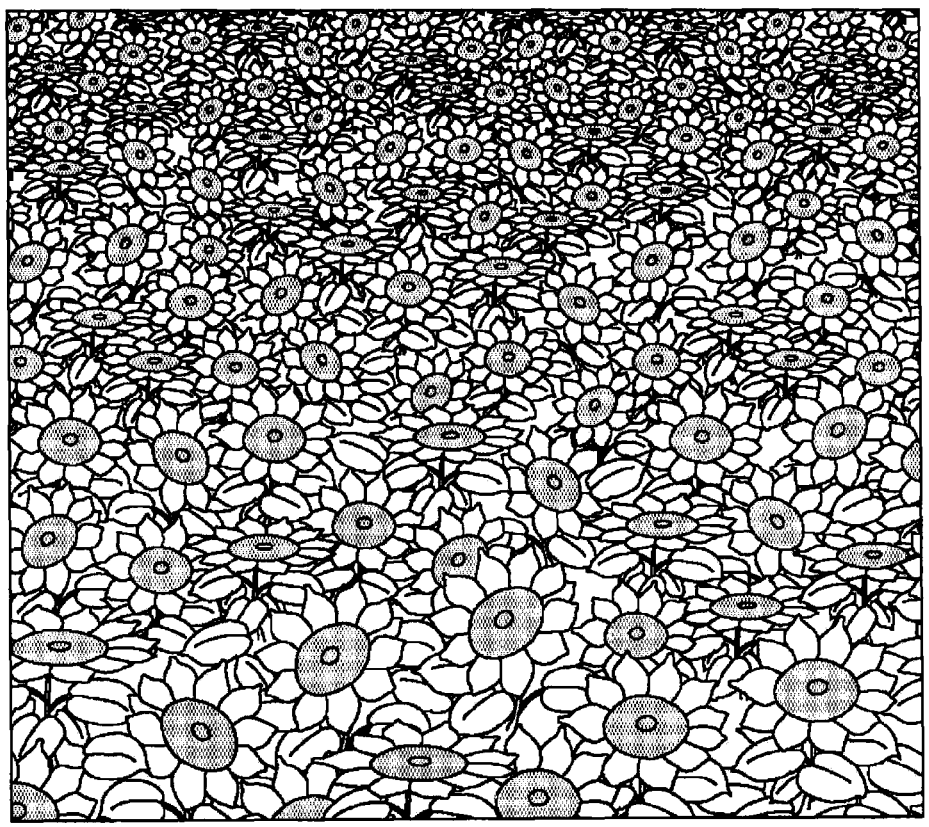
FIG. 8 is a diagram illustrating another image subjected to scene determination.

According to the above-described process, a feature amount is calculated based on the frequency information items and color information of a block having large amplitudes of frequency outputs. For example, in a landscape image including regions of high-frequency components (hereinafter, "high-frequency regions"), e.g., a leafy avenue shown in FIG. 7 or a flower garden in bloom shown in FIG. 8, a feature amount obtained by weighting color information items related to the high-frequency regions can be derived. As a result, whether the color of trees, serving as high-frequency regions, in FIG. 7 is green or yellow can be determined. Accordingly, the scene can be determined not as merely "avenue" but as "summer avenue" or "autumn avenue". Similarly, a determination can be made as to whether the color of the flower garden, serving as high-frequency regions, is white or yellow. Thus, the scene can be determined not as merely "flower garden" but as "autumn flower garden" or "summer flower garden".

As described above, season determination can be made on similar landscapes on the basis of colors. Accordingly, more detailed scene determination can be achieved.

This embodiment has been described with respect to the case where a color of a high-frequency component region is weighted in an input image. A color of a high-saturation region may be weighted in an input image.

2. Second Embodiment

Configuration of Image Processing Apparatus

Figure 9:
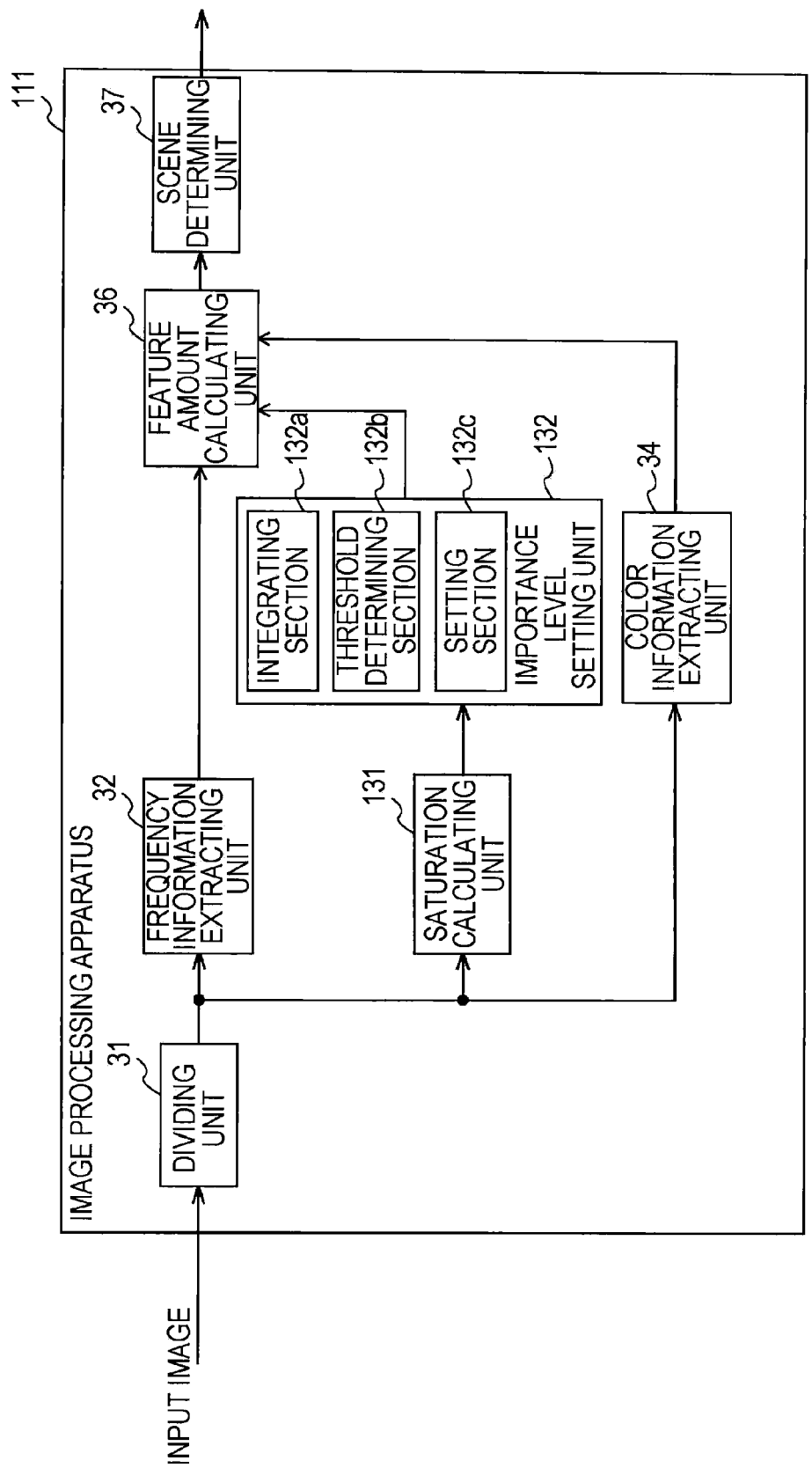
FIG. 9 is a block diagram illustrating an exemplary configuration of an image processing apparatus according to another embodiment of the present invention.

FIG. 9 illustrates an exemplary configuration of an image processing apparatus according to a second embodiment, the apparatus weighting a color of a high-saturation region in an input image. In the image processing apparatus, indicated at 111, of FIG. 9, the same functional components as those of the image processing apparatus 11 of FIG. 1 are designated by the same names and the same reference numerals and explanation of the previously described components is appropriately omitted.

In other words, the image processing apparatus 111 of FIG. 9 differs from the image processing apparatus 11 of FIG. 1 in that the image processing apparatus 111 includes a saturation calculating unit 131 and an importance level setting unit 132 instead of the edge region detecting unit 33 and the importance level setting unit 35.

Referring to FIG. 9, the frequency information extracting unit 32 extracts frequency information indicating frequency components of spatial frequencies from each block supplied from the dividing unit 31 using the predetermined filter and supplies the frequency information only to the feature amount calculating unit 36.

The saturation calculating unit 131 calculates saturations for each block supplied from the dividing unit 31 and supplies the saturations to the importance level setting unit 132. More specifically, the saturation calculating unit 131 calculates a saturation for each pixel constituting a target block using the following expression.

$$\text{Saturation} = \frac{\text{MAX} - \text{MIN}}{\text{MAX}} \qquad (2)$$

In Expression (2), MAX indicates a maximum value of R, G, and B values and MIN denotes a minimum value of R, G, and B values. When MAX=0, Saturation=0.

The importance level setting unit 132 sets a color-information importance level (weight) for color information, extracted from each block by the color information extracting unit 34, on the basis of the corresponding saturations supplied from the saturation calculating unit 131. The importance level setting unit 132 supplies the set color-information importance level of each block to the feature amount calculating unit 36.

The importance level setting unit 132 includes an integrating section 132a, a threshold determining section 132b, and a setting section 132c.

The integrating section 132a integrates the saturations calculated for the respective pixels in a target block.

The threshold determining section 132b determines whether an integrated value of the saturations in the target block is equal to or higher than a predetermined threshold value.

The setting section 132c sets a color-information importance level in accordance with a result of determination by the threshold determining section 132b.

Scene Determining Process by Image Processing Apparatus

Figure 10:
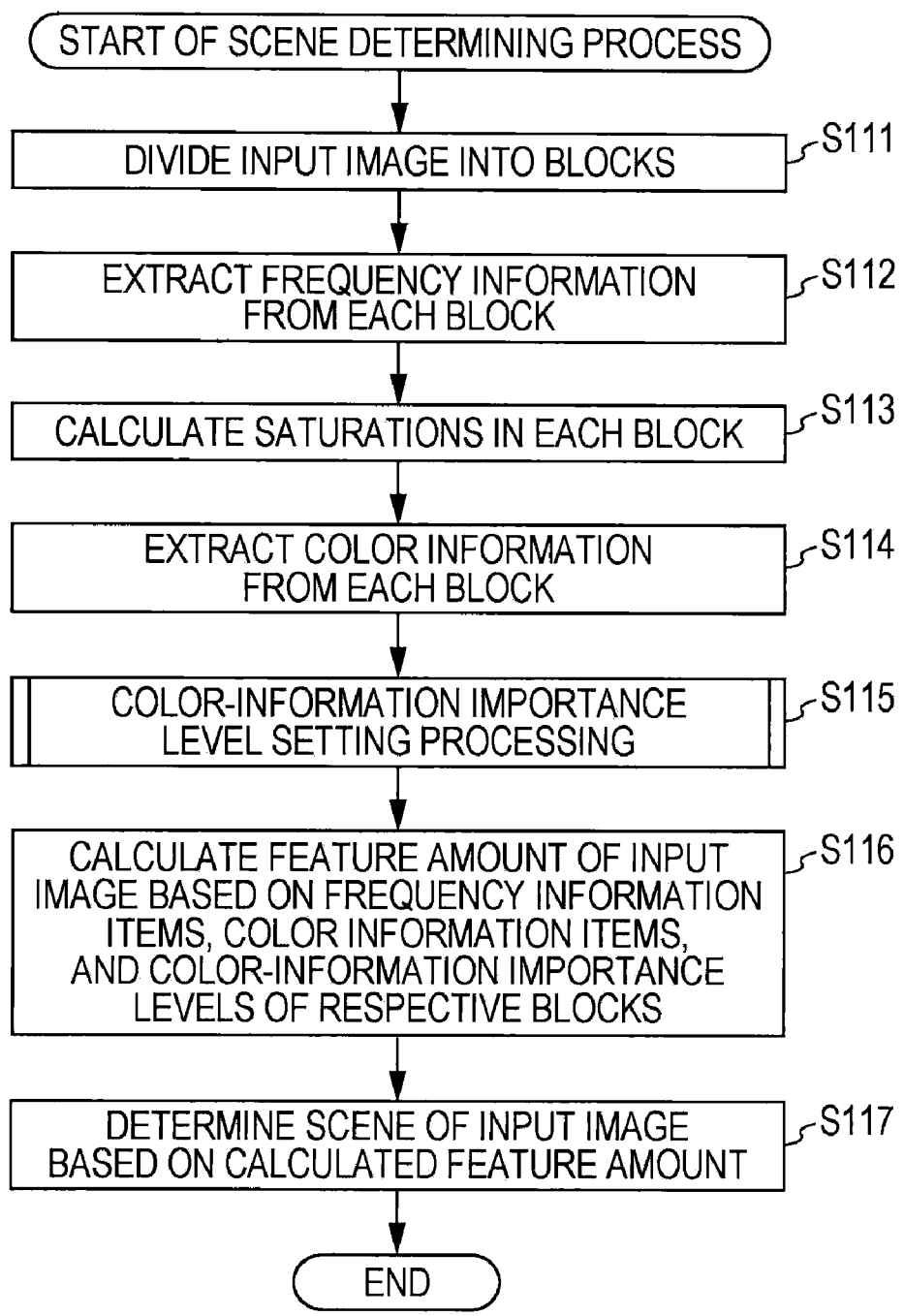
FIG. 10 is a flowchart explaining a scene determining process performed by the image processing apparatus in FIG. 9.

A scene determining process performed by the image processing apparatus 111 in FIG. 9 will now be described with reference to a flowchart of FIG. 10. Processing in step S111, that in step S112, that in step S114, that in step S116, and that in step S117 in the flowchart of FIG. 10 are the same as processing in step S11, that in step S12, that in step S14, that in step S16, and that in step S17, respectively. Explanation of those steps is therefore omitted.

In step S113, the saturation calculating unit 131 calculates saturations in each block supplied from the dividing unit 31 and supplies the saturations to the importance level setting unit 132.

In step S115, the importance level setting unit 132 performs color-information importance level setting processing of setting color-information importance levels for color information items of respective blocks on the basis of the saturations supplied from the saturation calculating unit 131.

Figure 11:
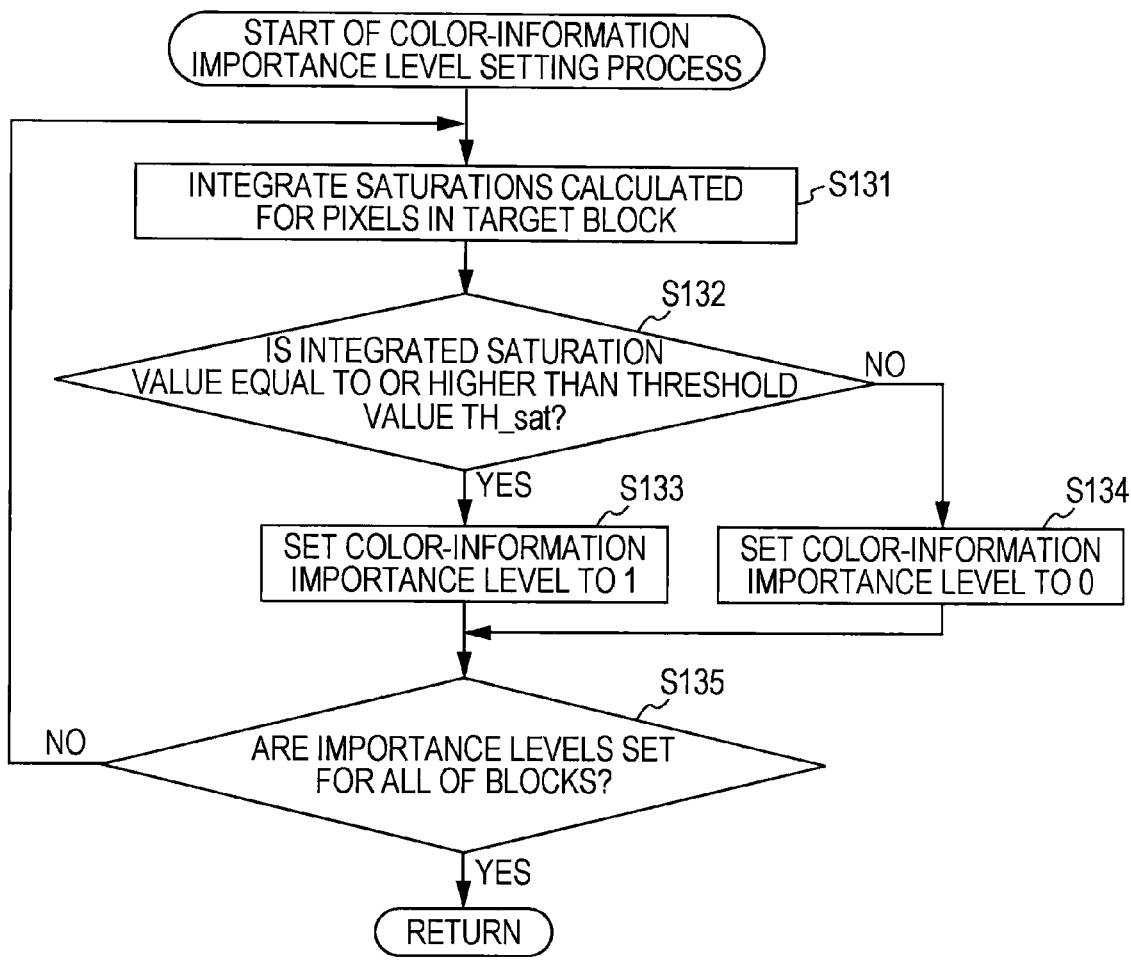
FIG. 11 is a flowchart explaining a color-information importance level setting process.

Color-Information Importance Level Setting Processing by Importance level Setting Unit The color-information importance level setting processing (or process) in step S115 in the flowchart of FIG. 10 will now be described with reference to a flowchart of FIG. 11.

In step S131, the integrating section 132a of the importance level setting unit 132 integrates the saturations calculated for respective pixels in a target block.

In step S132, the threshold determining section 132b determines whether an integrated value of the saturations (hereinafter, referred to as "integrated saturation value") in the target block is equal to or higher than a predetermined threshold value TH_sat.

Figure 12:
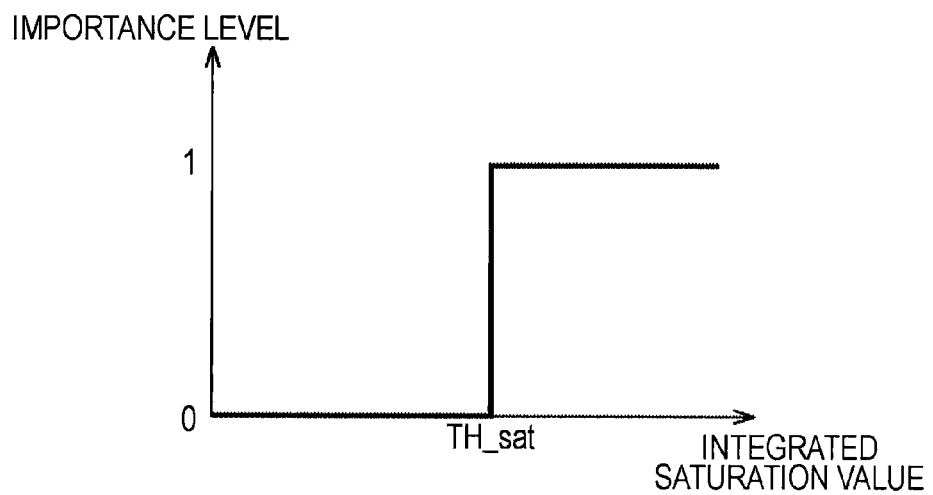
FIG. 12 is a diagram explaining setting of a color-information importance level.

When it is determined in step S132 that the integrated saturation value is equal to or higher than the predetermined threshold value TH_sat, the setting section 132c sets a color-information importance level of the target block to 1, as shown in FIG. 12, in step S133. The process proceeds to step S135.

FIG. 12 illustrates a change in the color-information importance level plotted against the integrated saturation value.

Referring to FIG. 12, when the integrated saturation value is equal to or higher than the predetermined threshold value TH_sat, the color-information importance level is set to 1. When the integrated saturation value is not equal to or higher than the predetermined threshold value TH_sat, the color-information importance level is set to 0.

On the other hand, if it is determined in step S132 that the integrated saturation value is not equal to or higher than the predetermined threshold value TH_sat, the setting section 132c sets a color-information importance level of the target block to 0, as shown in FIG. 12, in step S134. The process proceeds to step S135.

In step S135, the setting section 132c determines whether color-information importance levels are set for all of the blocks.

When it is determined in step S135 that the color-information importance levels are not set for all of the blocks, the process returns to step S131. Steps S131 to S135 are repeated until the color-information importance levels are set for all of the blocks.

Whereas, if it is determined in step S135 that the color-information importance levels are set for all of the blocks, the process returns to step S115 in the flowchart of FIG. 10.

One color-information importance level is set for each block in the above-described manner.

According to the above-described process, a weight can be set for a block having higher saturations on average.

As for the color-information importance levels, two values distinguished from each other using the threshold value TH_sat are used in the above description. Continuous values continuously varying in a range of 0 to 1 depending on an integrated value of saturations may be used as color-information importance levels.

As for threshold processing, a maximum saturation in a target block may be used as a threshold value.

Figure 13:
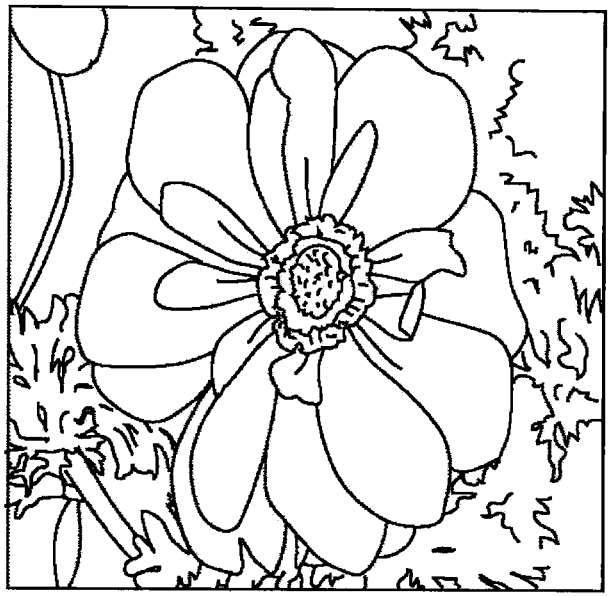
FIG. 13 illustrates an image subjected to scene determination.
Figure 14:
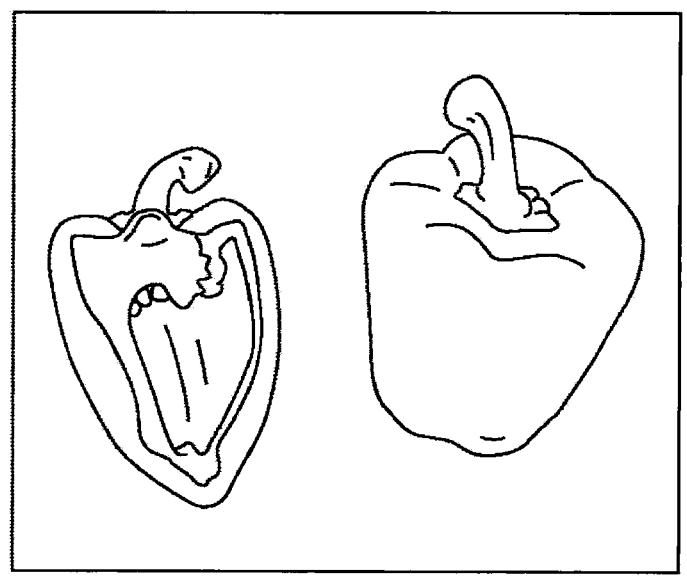
FIG. 14 illustrates another image subjected to scene determination.

According to the above-described process, a feature amount is calculated on the basis of the frequency information items and color information of a block with higher saturations. For example, in an image of a subject having a vivid color e.g., a macro shot of a flower shown in FIG. 13 or a vegetable, such as paprika, shown in FIG. 14, a feature amount obtained by weighting color information items related to high-saturation regions can be derived. As a result, whether the petal color of the flower is violet or yellow can be determined. Accordingly, the scene can be determined not as merely "flower" but as "violet flower" or "yellow flower". Similarly, a determination can be made as to whether the color of the paprika is red or yellow. Thus, the scene can be determined not as merely "vegetable" but as "read vegetable" or "yellow vegetable".

As described above, color determination can be made on objects (subjects) having similar shapes. Accordingly, more detailed scene determination can be achieved.

This embodiment has been described with respect to the case where a feature amount is calculated by weighting a color of a high-saturation region in an input image. A feature amount may be calculated on the basis of a color with high frequency of appearance in an input image.

3. Third Embodiment

Configuration of Image Processing Apparatus

Figure 15:
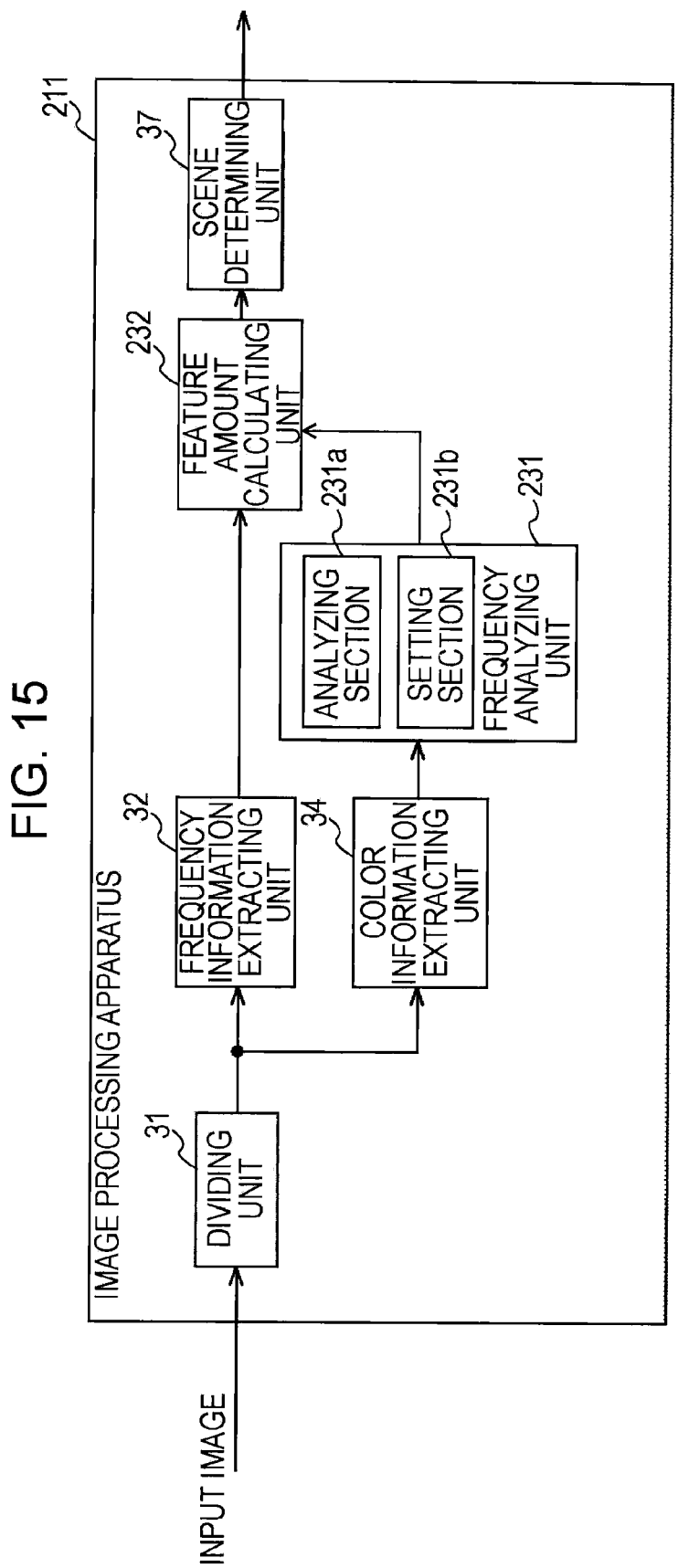
FIG. 15 is a block diagram illustrating an exemplary configuration of an image processing apparatus according to another embodiment of the present invention.

FIG. 15 illustrates an exemplary configuration of an image processing apparatus according to a third embodiment of the present invention, the apparatus calculating a feature amount on the basis of a color with high frequency of appearance. In the image processing apparatus, indicated at 211, of FIG. 15, the same functional components as those of the image processing apparatus 11 of FIG. 1 are designated by the same names and the same reference numerals and explanation of the previously described components is appropriately omitted.

In other words, the image processing apparatus 211 of FIG. 15 differs from the image processing apparatus 11 of FIG. 1 in that the edge region detecting unit 33 and the importance level setting unit 35 are removed, a frequency analyzing unit 231 is provided, and a feature amount calculating unit 232 is provided instead of the feature amount calculating unit 36.

The frequency analyzing unit 231 performs histogram analysis on color information of each block supplied from the color information extracting unit 34 on the basis of previously set classes. The frequency analyzing unit 231 sets highest-frequency-color information indicating a color with the highest frequency of appearance in the block on the basis of a result of analysis and supplies the information to the feature amount calculating unit 232.

The frequency analyzing unit 231 includes an analyzing section 231a and a setting section 231b.

The analyzing section 231a performs histogram analysis on color information (hue) related to pixels in a target block.

The setting section 231b sets highest-frequency-color information indicating a color with the highest frequency of appearance in the target block on the basis of a result of histogram analysis by the analyzing section 231a.

The feature amount calculating unit 232 calculates a feature amount of the input image on the basis of frequency information items of respective blocks supplied from the frequency information extracting unit 32 and the highest-frequency-color information items thereof supplied from the frequency analyzing unit 231 and supplies the calculated feature amount to the scene determining unit 37.

Scene Determining Process by Image Processing Apparatus

Figure 16:
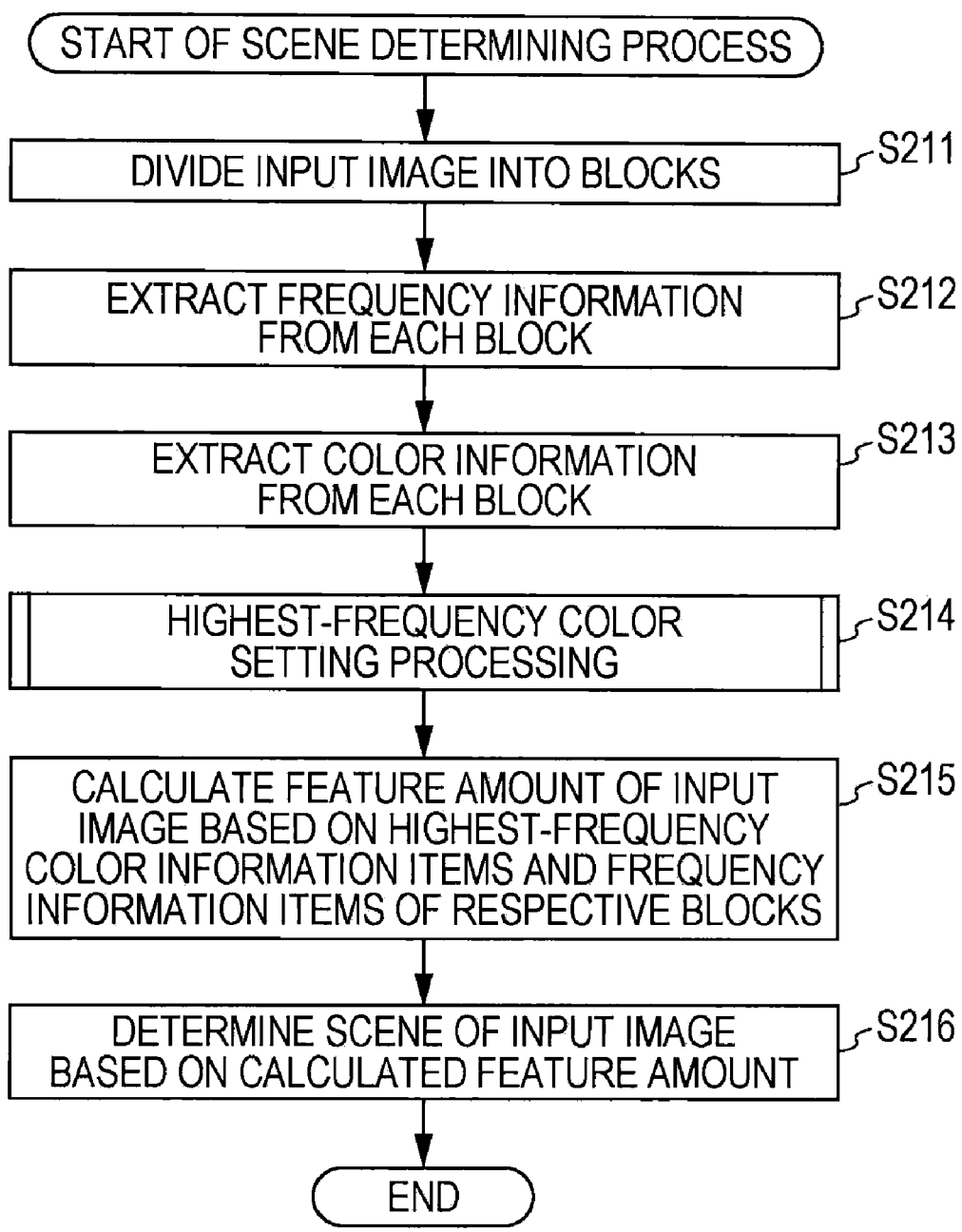
FIG. 16 is a flowchart explaining a scene determining process performed by the image processing apparatus in FIG. 15.

A scene determining process performed by the image processing apparatus 211 of FIG. 15 will now be described with reference to a flowchart of FIG. 16. Processing in step S211, that in step S212, that in step S213, and that in step S216 in the flowchart of FIG. 16 are the same as processing in step S11, that in step S12, that in step S14, and that in step S17 described with reference to the flowchart of FIG. 2, respectively. Explanation of those steps is therefore omitted.

In step S214, the frequency analyzing unit 231 performs highest-frequency color setting processing of performing histogram analysis on color information of each block, supplied from the color information extracting unit 34, on the basis of the previously set classes to set highest-frequency-color information indicating a color with the highest frequency of appearance in the block.

Highest-Frequency Color Setting Processing by Frequency Analyzing Unit

Figure 17:
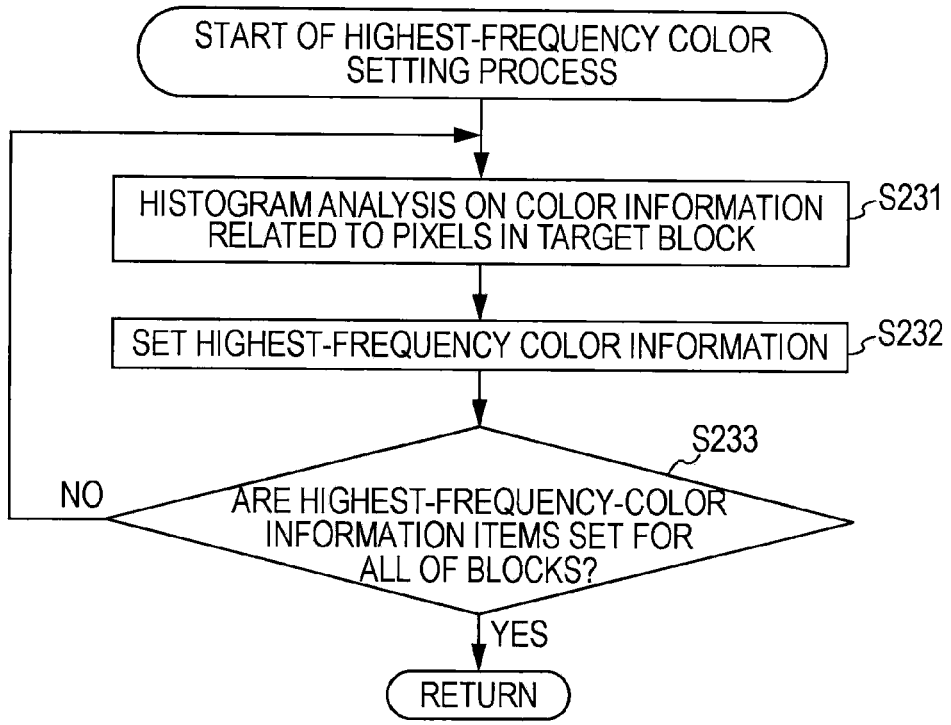
FIG. 17 is a flowchart explaining a highest-frequency color setting process.

The highest-frequency color setting processing (or process) in step S214 in the flowchart of FIG. 16 will now be described with reference to a flowchart of FIG. 17.

In step S231, the analyzing section 231a of the frequency analyzing unit 231 performs histogram analysis on color information (hue) related to pixels in a target block.

In step S232, the setting section 231b sets highest-frequency-color information indicating a color with the highest frequency of appearance in the target block on the basis of a result of histogram analysis by the analyzing section 231a.

In step S233, the setting section 231b determines whether highest-frequency-color information items are set for all of blocks.

When it is determined in step S233 that highest-frequency-color information items are not set for all of the blocks, the process returns to step S231. Steps S231 to S233 are repeated until highest-frequency-color information items are set for all of the blocks.

Whereas, if it is determined in step S233 that highest-frequency-color information items are set for all of the blocks, the process returns to step S214 in the flowchart of FIG. 16.

As described above, one highest-frequency-color information item is set for each block.

Referring again to the flowchart of FIG. 16, in step S215, the feature amount calculating unit 232 calculates a feature amount of an input image on the basis of frequency information items of respective blocks supplied from the frequency information extracting unit 32 and the highest-frequency-color information items thereof supplied from the frequency analyzing unit 231 and supplies the calculated feature amount to the scene determining unit 37.

The feature amount calculating unit 232 obtains a 512-dimensional vector as a feature amount based on the frequency information items and further obtains a 16-dimensional (=16 (blocks)×1 (highest-frequency-color information)) vector as a feature amount based on color information items using the highest-frequency-color information items.

The feature amount calculating unit 36 calculates 528-dimensional (=512 (dimensions)+16 (dimensions)) vector as a feature amount on the basis of the frequency information items and the color information items in this manner.

Figure 18:
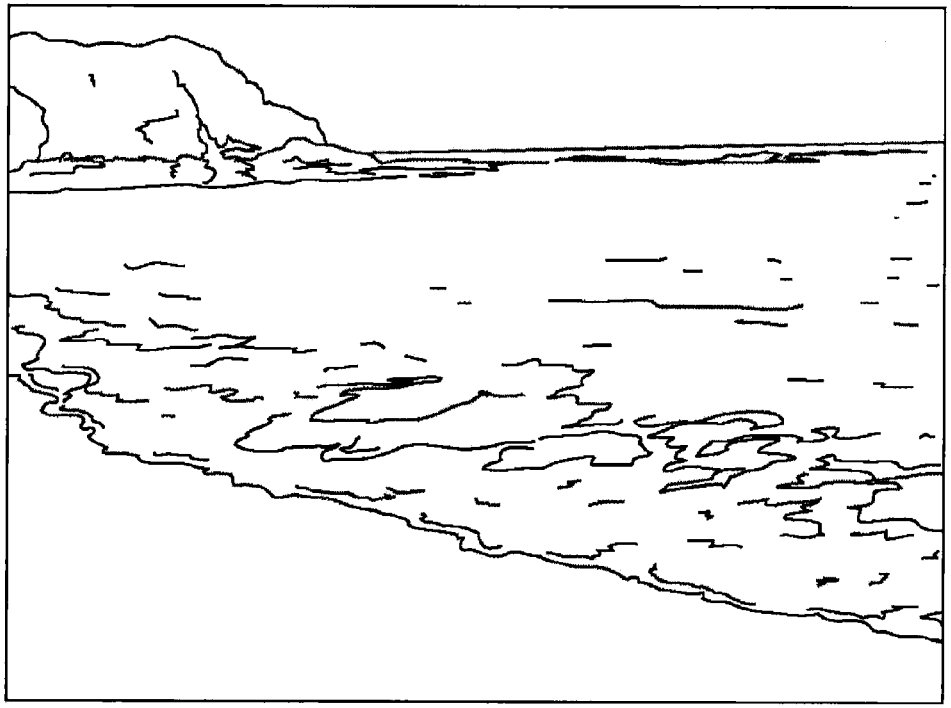
FIG. 18 illustrates an image subjected to scene determination.

According to the above-described process, a feature amount is obtained based on frequency information items and highest-frequency-color information items of respective blocks. For example, a feature amount can be obtained from an image of a beach, as shown in FIG. 18, on the basis of highest-frequency-color information items of respective blocks. As a result, a determination can be made as to whether the color of the beach shown in the lower part of FIG. 18 is gray or white. Accordingly, a determination can be made as to whether the scene shows, for example, not merely a "beach" but a "Japanese beach" or "southern beach". Similarly, a determination can be made as to whether the color of a sky (not shown) is vermillion or blur. Accordingly, a determination can be made as to whether the scene includes not merely a "sky" but a "sky at sunset" or "daytime sky". Furthermore, for example, a determination can be made as to whether the skin color of a person (not shown) is yellow, black, or white. Accordingly, a determination can be made as to whether a subject in a scene is not merely a "person" but, for example, an "Asian", "African", or "European".

Since color determination can be made on objects having similar shapes as described above, more detailed scene determination can be achieved.

The above-described series of processing steps can be executed by hardware or software. When the series of processing steps is executed by software, a program constituting the software is installed from a program recording medium into a computer incorporated in dedicated hardware or into a multi-purpose personal computer which is capable of executing various functions by installing various programs.

Figure 19:
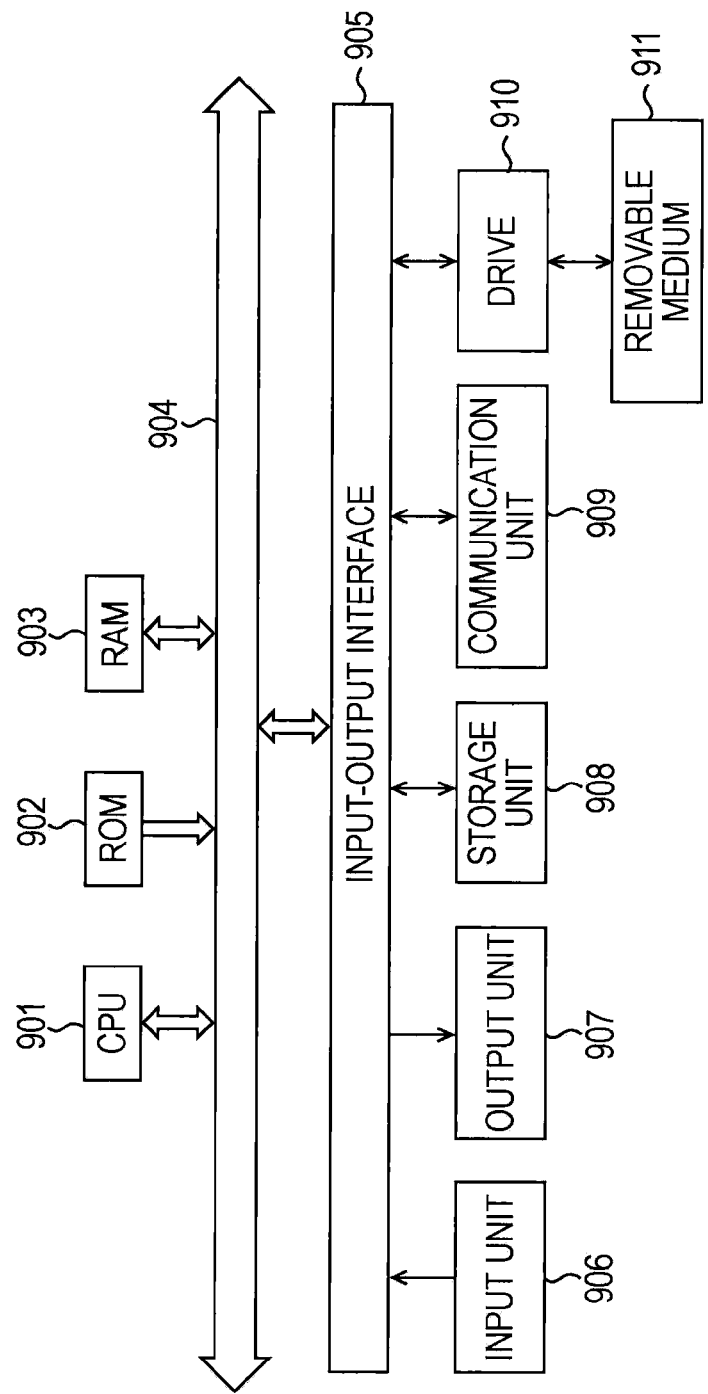
FIG. 19 is a block diagram illustrating an exemplary hardware configuration of a computer.

FIG. 19 is a block diagram illustrating an exemplary hardware configuration of a computer for executing the above-described series of processing steps in accordance with a program.

In the computer, a central processing unit (CPU) 901, a read only memory (ROM) 902, and a random access memory (RAM) 903 are connected to each other via a bus 904.

The bus 904 is connected to an input-output interface 905. The input-output interface 905 is connected to an input unit 906 including a keyboard, a mouse, and a microphone, an output unit 907 including a display and a speaker, a storage unit 908 including a hard disk and a nonvolatile memory, a communication unit 909 including a network interface, and a drive 910 that drives a removable medium 911, such as a magnetic disk, an optical disk, a magneto-optical disk, or a semiconductor memory.

In the computer with the above-described configuration, the CPU 901 loads the program stored in, for example, the storage unit 908 into the RAM 903 through the input-output interface 905 and the bus 904 and executes the program, so that the above-described series of processing steps is carried out.

As for the program executed by the computer (the CPU 901), the program recorded on the removable medium 911, serving as a package medium including a magnetic disk (including a flexible disk), an optical disk (such as a compact disc-read only memory (CD-ROM) or a digital versatile disc (DVD)), a magneto-optical disk, or a semiconductor memory, may be provided. Alternatively, the program may be provided through a wired or wireless transmission medium, such as a local area network, the Internet, or digital satellite broadcasting.

After the removable medium 911 is loaded into the drive 910, the program may be installed to the storage unit 908 through the input-output interface 905. Alternatively, the program may be received by the communication unit 909 through the wired or wireless transmission medium and be then installed to the storage unit 908. Alternatively, the program may be previously installed in the ROM 902 or the storage unit 908.

The program executed by the computer may be a program including processing steps which are carried out in time series in the described order in this specification or a program including processing steps which are carried out in parallel or individually at necessary timing, for example, in response to a call request.

The present application contains subject matter related to that disclosed in Japanese Priority Patent Application JP 2008-229311 filed in the Japan Patent Office on Sep. 8, 2008, the entire content of which is hereby incorporated by reference.

It should be understood that embodiments of the present invention are not limited to the above-described embodiments and various modifications may be made without departing from the spirit and scope of the present invention.

What is claimed is:

1. An image processing apparatus comprising:
dividing means for dividing an input image into blocks;
frequency information extracting means for extracting a frequency information item of the input image from each block;
color information extracting means for extracting a color information item of the input image from each block;
edge region detecting means for detecting an edge region from each block of the input image;
weighting means for weighting a block having an integrated value of the frequency information item, extracted from the block by the frequency information extracting means, equal to or higher than a predetermined threshold value; and
feature amount calculating means for calculating a feature amount of the input image on the basis of the frequency information items and the color information items of the blocks weighted by the weighting means;
wherein the weighting means weights a block having an integrated value of the frequency information item, extracted from the block excluding the edge region, equal to or higher than the predetermined threshold value.

2. The apparatus according to claim 1, further comprising:
saturation calculating means for calculating a saturation of each pixel of the input image;
wherein the weighting means weights a block having an integrated value of the saturations, extracted from the block by the saturation calculating means, equal to or higher than a predetermined threshold value.

3. The apparatus according to claim 1, further comprising:
highest-frequency color setting means for setting a highest-frequency-color information item indicating a color with the highest frequency of appearance in each block on the basis of the color information items of the input image, wherein
the feature amount calculating means calculates a feature amount of the input image on the basis of the frequency information items and the highest-frequency-color information items set for the blocks by the highest-frequency color setting means.

4. A method for image processing, comprising the steps of:
dividing an input image into blocks;
extracting a frequency information item of the input image from each block;
extracting a color information item of the input image from each block;
detecting an edge region from each block of the input image;
weighting a block having an integrated value of the frequency information item, extracted from the block excluding the edge region, equal to or higher than the predetermined threshold value; and
calculating a feature amount of the input image on the basis of the frequency information items and the color information items of the weighted blocks.

5. A non-transitory computer readable storage medium storing a computer program that allows a computer to perform a process comprising the steps of:
dividing an input image into blocks;
extracting a frequency information item of the input image from each block;
extracting a color information item of the input image from each block;
detecting an edge region from each block of the input image;
weighting a block having an integrated value of the frequency information item, extracted from the block excluding the edge region, equal to or higher than the predetermined threshold value; and
calculating a feature amount of the input image on the basis of the frequency information items and the color information items of the weighted blocks.

6. An image processing apparatus comprising:
a dividing unit for dividing an input image into blocks;
a frequency information extracting unit for extracting a frequency information item of the input image from each block;
a color information extracting unit for extracting a color information item of the input image from each block;
an edge region detecting unit for detecting an edge region from each block of the input image;
a weighting unit for weighting a block having an integrated value of the frequency information item, extracted from the block by the frequency information extracting unit, equal to or higher than a predetermined threshold value; and
a feature amount calculating unit for calculating a feature amount of the input image on the basis of the frequency information items and the color information items of the blocks weighted by the weighting unit;
wherein the weighting unit weights a block having an integrated value of the frequency information item, extracted from the block excluding the edge region, equal to or higher than the predetermined threshold value.

* * * * *